US011820902B2

(12) United States Patent
VanOudenhoven

(10) Patent No.: US 11,820,902 B2
(45) Date of Patent: Nov. 21, 2023

(54) HIGH BIO-RENEWABLE CONTENT PRINTING INKS

(71) Applicant: SUN CHEMICAL CORPORATION, Parsippany, NJ (US)

(72) Inventor: Guy VanOudenhoven, Menasha, WI (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/774,517

(22) PCT Filed: Dec. 23, 2020

(86) PCT No.: PCT/US2020/066791
§ 371 (c)(1),
(2) Date: May 5, 2022

(87) PCT Pub. No.: WO2021/138184
PCT Pub. Date: Jul. 8, 2021

(65) Prior Publication Data
US 2022/0356362 A1 Nov. 10, 2022

Related U.S. Application Data

(60) Provisional application No. 62/954,767, filed on Dec. 30, 2019.

(51) Int. Cl.
C09D 11/04 (2006.01)
B41M 5/00 (2006.01)
B65D 65/42 (2006.01)
C09D 11/023 (2014.01)
C09D 11/033 (2014.01)
C09D 11/037 (2014.01)
C09D 11/08 (2006.01)
C09D 11/107 (2014.01)

(52) U.S. Cl.
CPC ........... C09D 11/04 (2013.01); B41M 5/0023 (2013.01); B65D 65/42 (2013.01); C09D 11/023 (2013.01); C09D 11/033 (2013.01); C09D 11/037 (2013.01); C09D 11/08 (2013.01); C09D 11/107 (2013.01)

(58) Field of Classification Search
CPC ..... C09D 11/04; C09D 11/023; C09D 11/033; C09D 11/037; C09D 11/08; C09D 11/107; B41M 5/0023; B65D 65/42
See application file for complete search history.

(56) References Cited

U.S. PATENT DOCUMENTS

| 4,116,910 | A | * | 9/1978 | Rudolphy | ................. | C09F 1/04 524/270 |
| 4,857,624 | A | | 8/1989 | Deblasi | | |
| 5,164,446 | A | | 11/1992 | Boswell | | |
| 5,902,389 | A | | 5/1999 | Jordan | | |
| 6,180,705 | B1 | * | 1/2001 | Huebner | ................. | C08J 7/0427 524/379 |
| 6,583,263 | B2 | | 6/2003 | Gaudl | | |
| 2011/0100256 | A1 | | 5/2011 | Anderson et al. | | |

FOREIGN PATENT DOCUMENTS

| CA | 466 794 A | | 7/1950 |
| CA | 2303075 | | 4/1999 |
| CN | 1664039 | | 9/2005 |
| CN | 103031021 | | 4/2013 |
| CN | 105153714 | | 12/2015 |
| CN | 107267063 | | 10/2017 |
| CN | 107604749 | * | 1/2018 |
| CN | 109 370 298 | | 2/2019 |
| CN | 110527375 | | 12/2019 |
| CN | 111184051 | | 5/2020 |
| CN | 111621189 | | 9/2020 |
| CN | 112790221 | | 5/2021 |
| DE | 10 2015 112609 A1 | | 2/2017 |
| DE | 10 2105 112 609 | * | 2/2017 |
| EP | 0 117 452 A1 | | 9/1984 |
| EP | 0 194 355 | * | 12/1985 |
| KR | 10-2019-0134888 | | 12/2019 |

OTHER PUBLICATIONS

Machine translation of DE 10 2015 112 609 A1 (Year: 2017).*
Machine translation of CN 107604749 (Year: 2018).*
Chinese Office Action issued in counterpart CN Application No. 2020-80087759.1, dated Feb. 4, 2023 with English language summary thereof.
International Search Report issued in International Application No. PCT/US2020/066791, dated Apr. 8, 2021.
Written Opinion of the International Searching Authority issued in International Application No. PCT/US2020/066791, dated Apr. 8, 2021.
International Preliminary Report on Patentability (Chapter 1 of the Patent Cooperation Treaty) issued in International Application No. PCT/US2020/066791, dated Mar. 3, 2022.
Sharma Loveleen et al: "Composite film developed from the blends of sesame protein isolate and gum rosin and their properties thereof", Polymer Composites, vol. 39, No. 5, Jun. 1, 2016 (Jun. 1, 2016), pp. 1480-1487, XP055789620, US ISSN: 0272-8397, DOI: 10.1002/pc.24088, Retrieved from the Internet: URL:https://api.wiley.com/onlinelibrary/td m/vl/articles/10.1002%2Fpc.24088> [retrieved on Mar. 24, 2021] p. 1481, paragraph 2; tables 1,2.
Chinese Office Action issued in counterpart CN Application No. 2020-80087759.1, dated Jun. 12, 2023 with English language summary thereof.
Japanese Office Action issued in counterpart JP Application No. 2022-539696, dated Jan. 4, 2023 with English language summary thereof.

* cited by examiner

Primary Examiner — Doris L Lee
(74) Attorney, Agent, or Firm — Marian E. Fundytus; Ostrolenk Faber LLP.

(57) ABSTRACT

The present invention provides compositions, such as varnishes, ink vehicles, and finished inks, having high bio-renewable carbon (BRC) content. The compositions comprise protein and colophony.

25 Claims, No Drawings

HIGH BIO-RENEWABLE CONTENT PRINTING INKS

CROSS REFERENCE TO RELATED APPLICATIONS

The present application is a § 371 National Phase application based on PCT/US2020/066791 filed Dec. 23, 2020, which claims the benefit of U.S. Provisional Application No. 62/954,767, filed Dec. 30, 2019 the subject matter of each of which is incorporated by reference in their entirety.

FIELD OF THE INVENTION

The present invention is related to varnish compositions, and ink vehicles, inks, and coatings, prepared using the varnishes. The varnishes of the present invention have high bio-renewable content (i.e. bio-renewable carbon or BRC). The compositions comprise up to 100% BRC. The compositions are suitable for application to various substrates.

BACKGROUND OF THE INVENTION

Inks used to print on fast-food packaging materials and personal care products must have good adhesion to the substrate and must be resistant to moisture, chemicals, rubbing, etc. Personal care products include, for example, feminine care (e.g. sanitary napkin products), baby care (e.g. diapers and wipes), and other personal care end use products. This market is currently dominated by solvent-based inks that are largely based on materials that are not generally regarded as being environmentally friendly (e.g. alcohol-type solvents and acetates; organic pigments; and resins such as polyurethane and nitrocellulose).

Recently, there has been an interest in formulating inks that contain higher amounts of naturally derived materials, especially water-based inks. Naturally derived materials are those that are derived from plants, minerals, animals, microorganisms, or their reaction products. The amount of naturally derived materials in inks has been restricted because of failure to attain good adhesion, moisture resistance, chemical resistance, rub resistance, and other desirable properties, if the amount of naturally derived materials is too high. In addition, even when naturally derived materials are used in inks, it is generally necessary to include non-natural and environmentally harmful materials, such as petroleum distillates, to achieve the necessary properties. This is particularly an issue when the inks are intended for use on materials used for applications where the product is exposed to moisture, chemicals, or rubbing.

CA 2303075 discloses inks containing maleic modified rosin resins. However, these inks do not contain water, and contain high amounts of organic solvents that are generally considered to be harmful to the environment.

U.S. Pat. No. 4,857,624 discloses use of phenolic modified rosin ester in gravure printing inks. U.S. Pat. No. 5,164,446 describes rosin ester resins modified with a hydroxyl functional polymer, such as an acrylic polymer, for use in gravure printing inks.

U.S. Pat. No. 5,902,389 discloses rosin-based resin ink vehicles. However, these ink vehicles must contain high amounts of petroleum distillates, such as high boiling point ink oil.

U.S. Pat. No. 6,583,263 describes the synthesis of acrylated rosin esters. Although use of these acrylated rosin esters in energy-curable inks is mentioned, there is no teaching of how much can be included in an ink, and there are no examples showing use in an ink.

With the increased emphasis on using materials that are generally categorized as "bio-renewable" or "natural," there is now a need in the marketplace for water-based printing inks based on high bio-renewable content/bio-renewable carbon (BRC).

BRIEF SUMMARY OF THE INVENTION

The present invention provides varnishes having high bio-renewable content/bio-renewable carbon (BRC). The varnishes of the present invention are used to prepare coatings, ink vehicles, and finished inks, also having high BRC. The varnishes comprise equal to or greater than 90% BRC, based on the total weight of the varnish.

In a particular aspect, the present invention provides a water-soluble varnish, comprising:
  (a) 5 wt % to 20 wt % one or more neutralized unsaturated organic acids, based on the total weight of the varnish;
  (b) 40 wt % to 80 wt % water, based on the total weight of the varnish; and
  (c) 5 wt % to 20 wt % one or more proteins, based on the total weight of the varnish;
wherein the varnish comprises equal to or greater than 90% bio-renewable carbon (BRC) content.

In certain aspects, the varnishes of the present invention comprise about 100% BRC.

The present invention also provides coatings, ink vehicles and finished inks prepared from the varnishes. These materials also have a high BRC.

The present invention provides printed substrates comprising the varnishes, coatings, and finished inks of the present invention, and methods of preparing same. The substrates include, but are not limited to cotton, paper and paperboard, and synthetic materials (e.g. spunbond nonwoven fabrics consisting of polypropylene, polyester; cellulosic materials etc.).

The present invention provides printed articles comprising substrates printed with the varnishes, coating, and finished inks of the present invention.

These and other objects, advantages, and features of the invention will become apparent to those persons skilled in the art upon reading the details of the formulations and methods as more fully described below.

DETAILED DESCRIPTION OF THE INVENTION

The present application is in the field of printing inks for use on various materials and substrates such as for example cotton, paper and paperboard, and synthetic materials (e.g. spunbond nonwoven fabrics consisting of polypropylene, polyester, cellulosic materials etc.). End use applications include fast-food packaging materials, feminine care ("femcare", such as feminine hygiene and sanitary napkin products), baby care (such as baby diapers and wipes) and other personal care end use applications. This market is currently largely dominated by solvent-based inks that are largely based on materials that are not generally regarded as environmentally friendly (e.g. alcohol-type solvents and acetates; organic pigments; and resins such as polyurethane and nitrocellulose).

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

As used herein, "substrate" means any surface or object to which an ink or coating can be applied. Substrates include, but are not limited to, cellulose-based substrates, paper, paperboard, fabric (e.g. cotton), leather, textiles, felt, concrete, masonry, stone, plastic, plastic or polymer film, spunbond non-woven fabrics (e.g. consisting of polypropylene, polyester, and the like) glass, ceramic, metal, wood, composites, combinations thereof, and the like. Substrates may have one or more layers of metals or metal oxides, or other inorganic materials.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

As used herein, "natural material(s)" are materials that are botanic (plant-based), mineral-based, of animal original, derived from microorganisms, their reaction products, and combinations thereof, and water. Natural materials may be used as they occur in nature, or they can undergo processing that does not significantly alter the original physical, chemical, or biological state of the ingredient. Examples of permissible processing include dehydration, extraction, extrusion, centrifugation, filtration, distillation, grinding, sieving, compression, freezing, drying, milling, etc. Natural materials include, but are not limited to, water, natural resins, natural defoamers, natural waxes, natural colorants, bio-solvents, natural minerals, and the like.

As used herein, "BRC" refers to bio-renewable content or bio-renewable carbon, which can further be defined as non-ancient carbon (i.e. non-fossil-based carbon) that is part of earth's natural environment. Non-ancient carbon (less than 40,000 years after final atmospheric carbon incorporation) contains radiocarbon ($^{14}C$), whereas ancient (fossil-based) carbon does not contain radiocarbon. BRC refers to naturally occurring renewable resources that can be replenished to replace the portion depleted by usage and consumption, either through natural reproduction, or other recurring processes in a finite amount of time (such as within a human lifetime).

As used herein, "plant-based" refers to materials that contain equal to or greater than 50% of the ingredient mass from plant-based sources.

As used herein, "naturally derived" refers to materials with equal to or greater than 50% natural or biobased origin by molecular weight, based on renewable carbon content.

As used herein, "natural minerals" refers to inorganic materials occurring naturally in the earth, having a distinctive chemical formula and consistent set of physical properties (e.g. crystalline structure, hardness, colors, etc.). Also included are "derived minerals"—materials obtained through chemical processing of inorganic substances occurring naturally in the earth, which have the same chemical composition as natural mineral ingredients (e.g. calcium carbonate, silica, hydrated silica, sodium fluoride, titanium dioxide).

As used herein, "bio-based" refers to materials containing carbon of renewable origin from agricultural, plant, animal, fungi, microorganisms, marine, or forestry materials.

As used herein, "renewable" refers to materials that are part of earth's natural environment. Renewable resources are naturally occurring, and can be replenished to replace the portion depleted by usage and consumption, either through natural reproduction or other recurring processes, in a finite amount of time (such as within a human lifetime).

As used herein, "sustainable" refers to the quality of not being harmful to the environment or depleting natural resources, and thereby supporting long-term ecological balance.

As used herein, "colophony" refers to rosins/resins that come from the sap of coniferous trees, such as pines, junipers, firs, and cedars. Colophony comprises high molecular weight unsaturated acids.

As used herein, "short rheology" means that the composition has a higher cohesion with itself, than adhesion to a substrate. When compositions having short rheology are applied to a substrate, less material is delivered/applied because the composition pulls back (for example onto the knife).

As used herein, a "composition of the invention" refers generally to a varnish, coating, ink vehicle, or finished ink of the invention, unless a specific type of composition is referred to. Thus, when it is described that "a composition of the invention" comprises a material, it means that any of a varnish, coating, ink vehicle, or finished ink comprise that material in the stated amounts. A specific type of composition, e.g. varnish, will be referred to specifically where appropriate.

Varnishes and Other Compositions of the Invention, and Methods of Use

With increased emphasis on using natural materials, there is now a need in the marketplace for water-based printing inks based on high BRC content. Preferably, these inks comprise a water-based varnish having equal to or greater than 50% BRC. More preferably, the varnishes comprise equal to or greater than 60% BRC, or equal to or greater than 70% BRC, or equal to or greater than 80% BRC, or equal to or greater than 90% BRC. In certain preferred embodiments, the varnish comprises equal to or greater than 95% BRC, or equal to or greater than 98% BRC. Advantageously, the varnish of the invention comprises equal to or greater than 99% BRC, and most preferably 100% BRC.

The high BRC content varnishes of the present invention are used to make high BRC content ink vehicles. The ink vehicles would have equal to or greater than 45%, or equal to or greater than 50% BRC content, based on the total amount of carbon. In certain embodiments, the ink vehicles have equal to or greater than 60% BRC content, based on the total amount of carbon; or equal to or greater than 70%; or equal to or greater than 80%; or equal to or greater than 90%; or equal to or greater than 95%; or equal to or greater than 98%; or about 99% to 100%. The high BRC content ink vehicles would then be used to make high BRC content finished inks.

In preferred embodiments, the varnishes of the present invention used to make ink vehicles and finished inks contain equal to or greater than 99.5% BRC content. The finished inks made from the inventive varnishes and subsequent ink vehicles would preferably match the performance of traditional inks not formulated to have high bio-renewable content.

The bio-based carbon content (BRC) is determined using the standard method described in ASTM D6866 ("Standard Test Methods for Determining the Biobased Content of Natural Range Materials Using Radiocarbon and Isotope Ratio Mass Spectrometry Analysis"). See "Understanding biobased carbon content," *Society of the Plastics Industry Bioplastics Council* (February 2012). The application of ASTM D6866 to measure "bio-based content" is based on the same concepts as radiocarbon dating, but without using the age equations. The ratio of the amount of radiocarbon ($^{14}$C) in an unknown sample to that of a modern reference standard is determined. Fossil carbon contains no radiocarbon. The greater the amount of "new" carbon, the higher $^{14}$C. The ratio is reported as a percentage of the total carbon that is modern carbon, with the units "pMC" (percent modern carbon), or BRC (as a percentage). Some suppliers may assess a percentage of biobased content based on weight, based on the "recipe" the producer uses (i.e. how much of a natural material, such as cellulose, is present in a varnish containing cellulose and copolyester). However, it should be noted that the weight percent includes not just the contribution to the weight from the carbon, but also from the other elements in the materials. For the purposes of the present invention, the BRC content refers to the BRC as assessed using ASTM D6866.

In a preferred embodiment, the inventive water-based varnishes, ink vehicles and inks made therefrom would not contribute a higher level of greenhouse gas emissions in comparison to their current solvent-based alternatives.

Preferably, the inks made from the varnishes and ink vehicles of the present invention as well as the printed articles containing the inks would meet health and safety regulations in the specific countries where the ink is manufactured and used.

Advantageously, the finished ink compositions made from the varnishes and ink vehicles of the present invention would have acceptable performance properties (e.g. adhesion, resistance, printability, etc.) for their end-use requirements. In a preferred embodiment the water-based inks made from the varnishes and ink vehicles of the present invention would perform equally to or better than the current solvent-based alternatives, but this is not an absolute requirement as long as the water-based inks meet customer demands and specifications for ink performance. Other preferred advantageous qualities of the inks made from the varnishes and ink vehicles of the present invention include good printability and acceptable pass skin patch testing (no irritation).

The inks made from the varnishes and vehicles of the present invention are preferably suitable for printing on various substrates, for example all-natural cotton or synthetic materials (e.g. spunbond nonwoven fabrics consisting of polypropylene, polyester, etc.), especially those used for feminine care ("femcare", such as feminine hygiene and sanitary napkin products), baby care (such as baby diapers and wipes) and other personal care end use applications. The inks would preferably also meet end use requirements consistent with those of which are needed for femcare and baby care products, one of which is an Ink Adhesion Rating (IAR) rating of 4.0 or higher for dry rub and saline rub. In another embodiment the inks would also have a mineral oil rub rating of 4.0 or higher. Another preferred end use would be packaging materials, such as food packaging, fast food packaging, sandwich wrap stocks, PE coated bleached cup stock, etc.

In a preferred embodiment of the present invention, the resin material used to make the varnish would be a combination of neutralized unsaturated organic acid, water and protein. In another preferred embodiment, the unsaturated organic acid would be in the form of colophony. In another preferred embodiment, the protein would be in the form of anionic solution protein. Examples of other preferred natural materials for the water-based inks of the present invention include; resins, such as fumaric modified rosin ester; soy protein; ESO wet nitrocellulose; saccharides; polysaccharides; soybean oil based defoamer; waxes, such as carnauba wax and soy wax; mineral based pigments, such as Ultramarine, Oxide, *Spirulina*—a blue pigment derived from blue-green algae; and bio-propanol, a (blend of bio-renewable, non-toxic solvents).

The present invention is first time that it has been shown that a unique synergy occurs with a combination of anionic solution protein and colophony, that cannot otherwise be found in either component alone. Protein typically contains a mechanically tough, high molecular weight backbone with excellent oil resistance. Anionic solution protein alone is not a traditional film former and has poor water resistance, while colophony displays excellent water resistance alone, yet has poor oil resistance properties, mechanical durability, and short rheology. Colophony is not a traditional film former, yet the protein-colophony combines to be a film former (inhibits chemical penetration), and shows very good mechanical resistance, oil resistance and water resistance—compared to current industry offerings.

Colophony comes from the sap of coniferous trees, such as pines, junipers, firs, and cedars. Colophony comprises high molecular weight unsaturated acids, including isomers of abietic type acids and pimaric type acids. Representative acids are shown below.

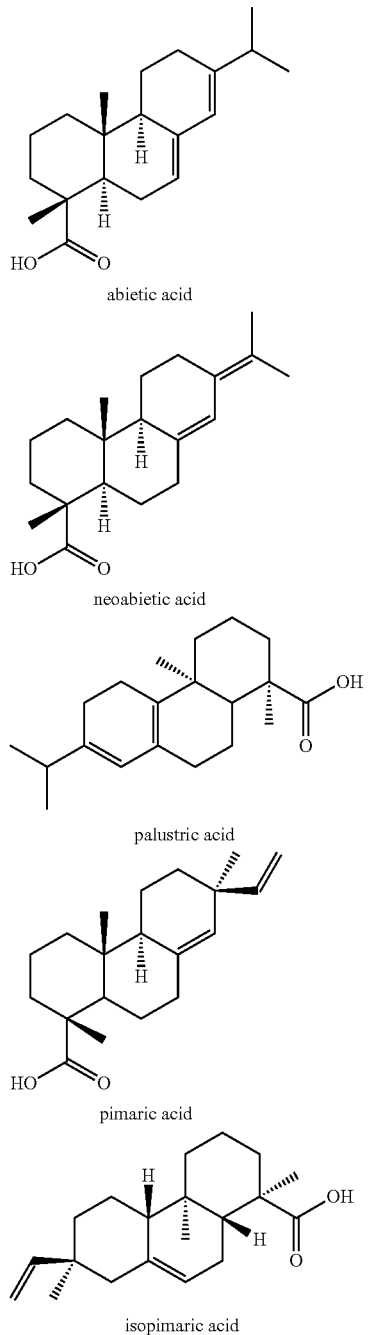

abietic acid neoabietic acid palustric acid pimaric acid isopimaric acid

The ratios of each type of acid depends on the source of the colophony. Abietic acid is used as the representative acid in the description of the present invention, but the same concepts apply to all of the acids in colophony. Colophony (or rosin) can be found in personal care and beauty products, diapers, feminine hygiene products, topical medications, surface coatings, lubricants, adhesives, sealants, and the like.

Plant proteins are polymer constructions of amino acids. Those amino acids are amphoteric, containing at least one ionizable alpha amino group and at least one ionizable alpha carboxylic group. Some amino acids are acidic or basic, containing an additional basic or acidic group on their sidechain. Depending on the amino acid constituents of a protein, water solubility can occur in an acidic and/or basic water environment. Consider the amino acid constituents of soy protein.

TABLE A

Amino acid composition of soy protein (calculated to 16% nitrogen)

| Amino acid | % |
| --- | --- |
| Arginine | 5.8 |
| Histidine | 2.3 |
| Lysine | 5.4 |
| Tyrosine | 4.1 |
| Tryptophan | 1.2 |
| Phenylalanine | 5.7 |
| Cystine | 0.9 |
| Methionine | 2.0 |
| Threonine | 4.0 |
| Leucine | 6.6 |
| Isoleucine | 4.7 |
| Valine | 4.2 |
| Glutamic acid | 21.0 |
| Aspartic acid | 8.8 |

Soy protein contains sufficient arginine, histidine and lysine to provide solubility in an acidic-water environment via ionization of those amino acid (basic) side chains. Soy protein also contains sufficient glutamic and aspartic acid to provide solubility in alkali-water via ionization of those amino acid (acidic) side chains. Those skilled in the art understand that soy protein is not significantly soluble in a pH neutral water environment, with formation of zwitterions not providing enough polarity for solubility. Solubilized soy protein (neutralized to increase hydrogen bonding sites) in an acidic medium displays a different set of physical properties than soy protein (non-neutralized) in an acidic medium. Solubilized soy protein contains enough hydrogen bonding sites to render the polymer fully soluble in water at higher solids content. Amino acids are generally soluble in water. The extent of solubility in water varies depending on the size and nature of the R group (see below). The acidic and basic amino acid constituents of a protein are highly water soluble when neutralized and much less soluble when non-neutralized. For soy protein, these physical differences are rooted in the cystine/cysteine amino acid, more specifically formation or inhibition of the disulfide bond during wet application and loss of volatile acid or amine component upon drying of a printing ink.

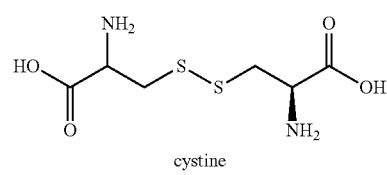

cystine

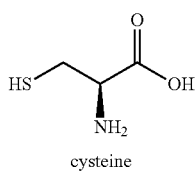

cysteine

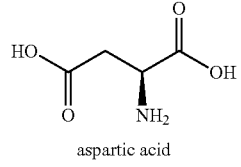

aspartic acid

The present invention is not limited to soy protein. In the context of the present invention, any plant protein can be used. Suitable proteins include, but are not limited to, soy, albumin, hemp, pea, potato, wheat gluten, rice, and combinations thereof.

TABLE B

Amino acid content of various proteins

| Amino acid | Whey concentrate | Soy isolate | Rice concentrate | Pea isolate |
|---|---|---|---|---|
| Alanine | 3.5 | 3.5 | 5.4 | 3.42 |
| Arginine | 2.3 | 6.66 | 9.1 | 7.11 |
| Aspartic acid | 8.4 | 9.79 | 8.6 | 9.67 |
| Cysteine | 1.7 | 1.4 | 2.4 | 0.85 |
| Glutamic acid | 13.3 | 18.07 | 17.2 | 14.14 |
| Glycine | 1.4 | 3.7 | 4.25 | 3.37 |
| Histidine | 1.6 | 2.5 | 2.1 | 2.02 |
| Isoleucine | 4.6 | 3.57 | 4.4 | 3.93 |
| Leucine | 8.8 | 7.03 | 8.3 | 8.72 |
| Lysine | 7.5 | 5.33 | 3.4 | 6.84 |
| Methionine | 1.6 | 1.21 | 3.17 | 0.82 |
| Phenylalanine | 2.6 | 4.54 | 5.45 | 4.36 |
| Proline | 6.6 | 4.73 | 4.9 | 3.41 |
| Serine | 4.6 | 3.93 | 4.8 | 4.27 |
| Threonine | 4.5 | 3.36 | 3.6 | 2.87 |
| Tryptophan | 1.3 | 0.72 | 1.2 | 0.72 |
| Tyrosine | 2.3 | 2.98 | 5.4 | 3.02 |
| Valine | 4.4 | 3.45 | 6.1 | 4.15 |

*Azad Singh Fitness website "All you need to know about protein"

The above Table B demonstrates the presence of amino acids Cys (cysteine/cystine), Asp (aspartic acid) and Glu (glutamic acid) in soy, whey, rice, and pea proteins. These amino acids are important to the present invention. More specifically, Asp and Glu are the acidic amino acids responsible for alkali neutralization of the protein, and solubility in alkali-water carriers. The Cys is the key amino acid containing sulfur, which forms disulfide bonds above pH 7.0, and interacts directly with colophony to present positive ink performance attributes. Although this table shows only whey, soy, rich, and pea protein, it is not unreasonable to surmise that most, if not all, proteins (e.g. hempseed, egg white, potato, wheat gluten) also contain the amino acids Cys, Glu, and Asp. The structures of cystine and cysteine are shown above. The structures of Glu and Asp are shown below.

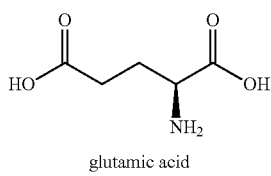

glutamic acid

In certain embodiments, it is preferable to solubilize the protein in an acid medium, rather than an alkaline medium. In an alkaline medium, the disulfide bond of cystine remains in the solubilized protein. In an acidic medium, the disulfide bonds are lost. This is depicted in Equation 1 and Equation 2 below.

Equation 1: protein solubilized in alkali-water medium:

$$R^P\text{—COOH}\text{—NH}_4\text{OH} \rightarrow R^{sp}\text{—COO}^-+\text{NH}_4^++\text{H}_2\text{O} \quad (A)$$

Also occurring simultaneously at the disulfide bond of cystine:

$$R^{sp}\text{-cystine-S—S-cystine-}R^{sp} \rightarrow \text{disulfide bond}$$
remains in solubilized protein wherein $R^P$ is the dry protein, and $R^{sp}$ is the solubilized protein. (B)

Equation 1 shows that anionic neutralization of protein creates disulfide bonds in solution and maintains those bonds during loss of water within a printed ink. Disulfide bonds lower protein solution solids due to de facto higher molecular weight and therefore have the undesired effect of lower mechanical resistance and anchoring interactions in subsequent finished inks. Thus, disulfide bonds are preferably avoided in the varnishes and ink vehicles of the present invention and the finished inks or coatings made therefrom.

Equation 2: protein solubilized in acid-water medium $$R^P\text{-NH}_2+\text{H}^+ \rightarrow R^{sp}\text{—NH}_3^+ \quad (A)$$

Also occurring simultaneously:

$$R^P\text{-cystine-S—S-cystine-}R^P \rightarrow (2)R^{sp}\text{-cysteine-S—H} \quad (B)$$

wherein $R^P$ is the dry protein, and $R^{sp}$ is the solubilized protein.

Equation 2 shows that the disulfide R—S—S—R occurring in dry protein are lost during acidic neutralization as the sulfur moiety of cystine converts to the R—SH construction of cysteine.

When protein solubilized in acidic medium is mixed with an organic unsaturated acid, such as colophony, a protein:colophony complex is formed.

$$(2)R^{sp}\text{-cysteine-S—H} \rightarrow R\text{-cysteine-SH:colophony complex}$$

The acidic sulfur of cysteine allows ligand donation from colophony. The synergy between colophony and sulfur-containing amino acid creates stable steric protection, preventing forming of the disulfide bonds, which consequently results in finished inks with good mechanical resistance properties.

One of the novel features of the present invention is the resistance performance (e.g. mechanical, water, and oil resistance) of the inks having high BRC content made from the inventive ink varnishes and ink vehicles. Without being bound by theory, applicants theorize that the unsaturated organic acid may be associating/reacting with the cysteine amino acid groups of the protein when the protein is solubilized in an acidic medium, being held in permanent proximity and responsible for inhibition of disulfide bond formation when the solubilized protein is then included in an alkali medium. The protein is solubilized in an acidic medium. The colophony is also in the acidic medium, becoming soluble as it reacts with the cysteine. The pH of the solution is then elevated, to a pH of 9 with ammonia, with the colophony "cap" in place on the cysteine. Most water-based inks are anionic, requiring a final pH near 9. Disulfide bonds dictate lower solids at maintained viscosity. Prior art solution resins include, but are not limited to, Reactol 5145E (a polyester from Lawter), Filtrez 531 (a fumaric modified ester from Lawter), Amberyl 890LV (fumaric adduct of gum rosin partially esterified with alcohols from Tri-iso), and the like.

Colophony contains two nucleophilic sites capable of reacting, complexing, or associating with sulfur and cysteine. One reactive site is the PI electrons that produce unsaturation. A second site is the carboxylic acid. Without being bound by theory, applicants suggest that the sulfur of cysteine is forming a complex with the PI electrons of colophony. That complex and proximity of colophony is sterically preventing the formation of a disulfide bond at pH greater than 7.0, precluding the negative performance attributes associated with disulfide bond formation with the solubilized polymer.

Confirmation of disulfide bond formation may be obtained via infrared (IR) analysis of proteins alone in alkali solution and protein-colophony combinations in alkali solution at 500 to 540 $cm^{-1}$. A disulfide bond can be detected as an IR spectrophotometer stretch.

Properties, ink attributes generally measured, of soy protein solubilized in an acidic medium versus an alkali medium are shown in Table C.

TABLE C

Properties of solubilized soy protein

| Soy Protein Physical Attribute | Solubilized in Carbonic Acid Water pH = 4.5 | Solubilized in Ammonia water pH = 9.5 |
| --- | --- | --- |
| Sulfur containing amino acid form in polymer | Cysteine | Cystine |
| Percent protein Solids @ 35 seconds viscosity #2 EZ Zahn Cup | 21% | 16% |
| Disulfide bonded protein polymer | No | Yes |
| Film formation at 25° C. when dry[1] | Yes | No |
| Water resistance when dry[2] | High | Low |
| Anchoring/adhesion to electron rich print stocks[3] | Excellent | Poor |

[1]Film formation was determined with ambient application of wet varnish onto glass using a 1 mil (25.4 µm) bird applicator. The varnish was dried with a hot air gun, then removed with a razor blade. If the removed dry varnish forms a powder, then it is not a film former. If the dry varnish forms a continuous layer or sheet when removed from glass, it is considered a film former.

[2]Water resistance was determined by application of varnish to a 40 gram polyester film (LBT) using a flexographic 200 line 7.0 BCM hand proofer. Varnish was thoroughly dried with a hot air drier. Three drops of water were placed on the applied and dried varnish, and immediately wiped away with a paper napkin. If no removal of varnish was observed, water resistance is high. If the napkin removes significant amounts of varnish, water resistance is low.

[3]The same varnish application on PET was used for evaluation of adhesion. Several inches of 3M 610 tape was applied to the varnish and then pulled away slowly at a 120 degree angle. If the tape removed varnish from the PET, this indicated poor adhesion/anchoring. No loss of varnish from the PET indicates excellent anchoring/adhesion.

The compositions of the present invention typically comprise about 1 wt % to about 20 wt % unsaturated organic acids, based on the total weight of the composition. For example, the compositions of the invention may comprise about 1 wt % to about 15 wt % unsaturated organic acids, based on the total weight of the composition; or 1 wt % to about 10 wt %; or 1 wt % to about 5 wt %; or about 5 wt % to about 20 wt %; or about 5 wt % to about 15 wt % about 5 wt % to about 10 wt %; or about 10 wt % to about 20 wt %; or about 10 wt % to about 15 wt %; or about 15 wt % to about 20 wt %.

The compositions of the present invention typically comprise about 5 wt % to about 20 wt % protein, based on the total weight of the composition. For example, the compositions of the invention may comprise about 5 wt % to about 15 wt % protein, based on the total weight of the composition; or about 5 wt % to about 10 wt %; or about 10 wt % to about 20 wt %; or about 10 wt % to about 15 wt %; or about 15 wt % to about 20 wt %.

The compositions of the invention typically contain about 40 wt % to about 80 wt % water, based on the total weight of the composition. For example, the compositions of the invention may comprise about 40 wt % to about 75 wt % water, based on the total weight of the composition; or about 40 wt % to about 70 wt %; or about 40 wt % to about 65 wt %; or about 40 wt % to about 60 wt %; or about 40 wt % to about 55 wt %; or about 40 wt % to about 50 wt %; or about 40 wt % to about 45 wt %; or about 45 wt % to about 80 wt %; or about 45 wt % to about 75 wt %; or about 45 wt % to about 70 wt %; or about 45 wt % to about 65 wt %; or about 45 wt % to about 60 wt %; or about 45 wt % to about 55 wt %; or about 45 wt % to about 50 wt %; or about 50 wt % to about 80 wt %; or about 50 wt % to about 75 wt %; or about 50 wt % to about 70 wt %; or about 50 wt % to about 65 wt %; or about 50 wt % to about 60 wt %; or about 50 wt % to about 55 wt %; or about 55 wt % to about 80 wt %; or about 55 wt % to about 75 wt %; or about 55 wt % to about 70 wt %; or about 55 wt % to about 65 wt %; or about 55 wt % to about 60 wt %; or about 60 wt % to about 80 wt %; or about 60 wt % to about 75 wt %; or about 60 wt % to about 70 wt %; or about 60 wt % to about 65 wt %; or about 65 wt % to about 80 wt %; or about 65 wt % to about 75 wt %; or about 65 wt % to about 70 wt %; or about 70 wt % to about 80 wt %; or about 70 wt % to about 75 wt %; or about 75 wt % to about 80 wt %.

Although the present invention is drawn to water-based systems, there may also be small amounts of organic solvents. When organic solvents are present, the compositions of the present invention typically comprise about 0.01 wt % to about 6 wt % organic solvent, based on the total weight of the composition. For example, the compositions may comprise about 0.01 wt % to about 5.5 wt % organic solvent, based on the total weight of the composition; or about 0.01 wt % to about 5 wt %; or about 0.01 wt % to about 4 wt %; or about 0.01 wt % to about 3 wt %; or about 0.01 wt % to about 2 wt %; or about 0.01 wt % to about 1 wt %; or about 0.01 wt % to about 0.5 wt %; or about 0.5 wt % to about 6 wt %; or about 0.5 wt % to about 5 wt %; or 0.5 wt % to about 4 wt %; or about 0.5 wt % to about 3 wt %; or about 0.5 wt % to about 2 wt %; or about 0.5 wt % to about 1 wt %; or about 1 wt % to about 6 wt %; or about 1 wt % to about 5 wt %; or about 1 wt % to about 4 wt %; or about 1 wt % to about 3 wt %; or about 1 wt % to about 2 wt %; or about 2 wt % to about 6 wt %; or about 2 wt % to about 5 wt %; or about 2 wt % to about 4 wt %; or about 2 wt % to about 3 wt %; or about 3 wt % to about 6 wt %; or about 3 wt % to about 5 wt %; or about 3 wt % to about 4 wt %; or about 4 wt % to about 6 wt %; or about 4 wt % to about 5 wt %; or about 5 wt % to about 6 wt %.

In preferred embodiments, one or more of the organic solvents used in the inks of the present invention are bio-based solvents (natural materials). Bio-solvents are renewable and non-toxic. Biomass is a renewable resource for producing bio-solvents. For example, starch, lignocellulose, plant oils, animal fats and proteins can be used to synthesize various bio-derived solvents, including, but not limited to, acids, alkanes, aromatics, ionic liquids (ILs), furans, esters, ethers, liquid polymers and deep eutectic solvents (DESs). Bio-solvents include, but are not limited to, bio-alcohols, bio-ethers, bio-esters, bio-acids, bio-fatty acid methyl esters. In certain embodiments, bio-alcohols are preferred. A preferred bio-alcohol is bio-propanol. Blends of bio-solvents are also suitable for use in the inks of the present invention. Suitable bio-solvents include, but are not limited to, PRO-100™ (chimista Specialty Chemicals); Augeo™ (Solvay); and Cyrene™ (dihydrolevoglucosenone; Circa Group). In the coatings industry, PRO-100™ is a useful bio-solvent blend that can be used in industrial, architectural, DTM (Direct to Metal), and other coatings and coating application. The solubility parameters of PRO-100™ are similar to those of n-propanol, making it an excellent bio-based, performance alternative for formulators wanting to increase the bio-renewable carbon content in their formulations. PRO-100™ contains greater than 95% bio-renewable carbon.

Preferably, the organic solvents of the inks of the present invention contain equal to or greater than 1 wt % bio-solvents, based on the total weight of the solvents. For example, the solvents contain about 1 wt % to about 100 wt % bio-solvent, based on the total weight of the solvents. For example, the bio-solvents may be present in an amount of about 1 wt % to about 90 wt %, based on the total weight of the solvents; or about 1 wt % to about 80 wt %; or about 1 wt % to about 70 wt %; or about 1 wt % to about 60 wt %; or about 1 wt % to about 50 wt %; or about 1 wt % to about 40 wt %; or about 1 wt % to about 30 wt %; or about 1 wt % to about 20 wt %; or about 1 wt % to about 10 wt %; or about 10 wt % to about 100 wt %; or about 10 wt % to about 90 wt %; or about 10 wt % to about 80 wt %; or about 10 wt % to about 70 wt %; or about 10 wt % to about 60 wt %; or about 10 wt % to about 50 wt %; or about 10 wt % to about 40 wt %; or about 10 wt % to about 30 wt %; or about 10 wt % to about 20 wt %; or about 20 wt % to about 100 wt %; or about 20 wt % to about 90 wt %; or about 20 wt % to about 80 wt %; or about 20 wt % to about 70 wt %; or about 20 wt % to about 60 wt %; or about 20 wt % to about 50 wt %; or about 20 wt % to about 40 wt %; or about 20 wt % to about 30 wt %; or about 30 wt % to about 100 wt %; or about 30 wt % to about 90 wt %; or about 30 wt % to about 80 wt %; or about 30 wt % to about 70 wt %; or about 30 wt % to about 60 wt %; or about 30 wt % to about 50 wt %; or about 30 wt % to about 40 wt %; or about 40 wt % to about 100 wt %; or about 40 wt % to about 90 wt %; or about 40 wt % to about 80 wt %; or about 40 wt % to about 70 wt %; or about 40 wt % to about 60 wt %; or about 40 wt % to about 50 wt %; or about 50 wt % to about 100 wt %; or about 50 wt % to about 90 wt %; or about 50 wt % to about 80 wt %; or about 50 wt % to about 70 wt %; or about 50 wt % to about 60 wt %; or about 60 wt % to about 100 wt %; or about 60 wt % to about 90 wt %; or about 60 wt % to about 80 wt %; or about 60 wt % to about 70 wt %; or about 70 wt % to about 100 wt %; or about 70 wt % to about 90 wt %; or about 70 wt % to about 80 wt %; or about 80 wt % to about 100 wt %; or about 80 wt % to about 90 wt %; or about 90 wt % to about 100 wt %.

The compositions of the invention optionally comprise one or more neutralizing agents. Suitable anionic neutralizing agents include, but are not limited to, ammonia, higher amines, and combinations thereof. When present, neutralizing agents are typically present in the compositions of the invention in an amount of about 1 wt % to about 20 wt %, based on the total weight of the composition. For example, neutralizing agents may be present in the compositions of the invention in an amount of about 1 wt % to about 15 wt %, based on the total weight of the composition; or about 1 wt % to about 10 wt %; or about 1 wt % to about 5 wt %; or about 5 wt % to about 20 wt %; or about 5 wt % to about 15 wt %; or about 5 wt % to about 10 wt %; or about 10 wt % to about 20 wt %; or about 10 wt % to about 15 wt %; or about 15 wt % to about 20 wt %.

The compositions of the invention optionally comprise one or more additives, including, but not limited to, waxes, defoamers, silicones, coefficient of friction adjusting additives, adhesion promoters, stabilizers, optical brighteners, de-gassing additives, flow promoters, antioxidants, surfactants, dispersants, plasticizers, rheological additives, and combinations thereof.

In certain embodiments, one or more additives are natural materials. For example, defoamers and waxes are advantageously natural materials. Suitable defoamers include, but are not limited to, soy bean based defoamers. Suitable waxes include, but are not limited to, amide wax, erucamide wax, polypropylene wax, paraffin wax, polyethylene wax, polytetrafluoroethylene wax, carnuba wax, soybean wax, and combinations thereof.

When present, the additives are each individually present in the compositions of the invention in an amount of about 0.1 wt % to about 5 wt %, based on the total weight of the composition.

The varnishes can be applied to substrates themselves, e.g. as coatings, or they may be used to make ink vehicles or finished inks. Ink vehicles and finished inks of the invention comprise the varnishes of the invention, plus other materials typically used in inks and coatings.

In a particular aspect, the present invention provides an ink vehicle comprising the varnish of the invention and an emulsion polymer. Suitable emulsion polymers include, but are not limited to, Indulor BRC Induprint SE 1611 (an emulsion polymer based on styrene and acrylate), Hydrite Hydriprint 605 NV (a styrene-acrylic emulsion polymer), and BASF Joncryl LMV 7031 (a pH stable acrylic emulsion). In certain embodiments, the emulsion polymers are based on styrene and acrylates.

The ink vehicle of the invention typically comprises the varnish of the invention in an amount of about 10 wt % to about 80 wt %, based on the total weight of the ink vehicle. For example, the varnish may be present in the ink vehicle in an amount of about 10 wt % to about 70 wt %, based on the total weight of the ink vehicle; or about 10 wt % to about 60 wt %; or about 10 wt % to about 50 wt %; or about 10 wt % to about 40 wt %; or about 10 wt % to about 30 wt %; or about 10 wt % to about 20 wt %; or about 20 wt % to about 80 wt %; or about 20 wt % to about 70 wt %; or about 20 wt % to about 60 wt %; or about 20 wt % to about 50 wt %; or about 20 wt % to about 40 wt %; or about 20 wt % to about 30 wt %; or about 30 wt % to about 80 wt %; or about 30 wt % to about 70 wt %; or about 30 wt % to about 60 wt %; or about 30 wt % to about 50 wt %; or about 30 wt % to about 40 wt %; or about 40 wt % to about 80 wt %; or about 40 wt % to about 70 wt %; or about 40 wt % to about 60 wt %; or about 40 wt % to about 50 wt %; or about 50 wt % to about 80 wt %; or about 50 wt % to about 70 wt %; or about 50 wt % to about 60 wt %; or about 60 wt % to about 80 wt %; or about 60 wt % to about 70 wt %; or about 70 wt % to about 80 wt %.

The ink vehicle of the invention typically contains the emulsion polymer in an amount of about 5 wt % to about 50 wt %, based on the total weight of the ink vehicle. For example, the emulsion polymer may be present in an amount of about 5 wt % to about 40 wt %, based on the total weight of the ink vehicle; or about 5 wt % to about 30 wt %; or about 5 wt % to about 20 wt %; or about 5 wt % to about 10 wt %; or about 10 wt % to about 50 wt %; or about 10 wt % to about 40 wt %; or about 10 wt % to about 30 wt %; or about 10 wt % to about 20 wt %; or about 20 wt % to about 50 wt %; or about 20 wt % to about 40 wt %; or about 20 wt % to about 30 wt %; or about 30 wt % to about 50 wt %; or about 30 wt % to about 40 wt %; or about 40 wt % to about 50 wt %.

The ink vehicles of the invention advantageously have equal to or greater than about 45% BRC content, based on the total carbon in the ink vehicle (i.e. equal to or greater than 45% of the carbon containing materials are in the form of bio-renewable carbon). For example, the ink vehicle may have equal to or greater than about 50% BRC content, based on the total carbon in the ink vehicle; or equal to or greater than about 55%; or equal to or greater than about 60%.

In another aspect, the present invention provides finished inks comprising the ink vehicles of the invention. It is to be noted that, in embodiments where the ink vehicle does not contain a colorant, it can be used as a clear finished ink. In certain embodiments, the finished inks of the invention comprise the ink vehicles of the invention and one or more colorants. In certain embodiments, the colorants are provided as dispersions or emulsions, for example, as pigment dispersions. Suitable colorants include pigments (such as, but not limited to, mineral pigments) and dyes (such as, but not limited to, plant based dyes). Suitable colorants include, but are not limited to, ultramarine blue derived from lapis lazuli, Linablue derived from Spirulina, iron-oxide pigments, copper pigments, titanium pigments, zinc pigments, aluminum pigments, carbon pigments, and combinations thereof.

The finished inks of the invention typically contain the ink vehicle of the invention in an amount of about 30 wt % to about 99 wt %, based on the total weight of the finished ink. For example, the finished ink may comprise about 30 wt % to about 95 wt % ink vehicle, based on the total weight of the finished ink; or about 30 wt % to about 90 wt %; or about 30 wt % to about 80 wt %; or about 30 wt % to about 70 wt % or about 30 wt % to about 60 wt %; or about 30 wt % to about 50 wt %; or about 30 wt % to about 40 wt %; or about 40 wt % to about 99 wt %; or about 40 wt % to about 95 wt %; or about 40 wt % to about 90 wt %; or about 40 wt % to about 80 wt %; or about 40 wt % to about 70 wt %; or about 40 wt % to about 60 wt %; or about 40 wt % to about 50 wt %; or about 50 wt % to about 99 wt %; or about 50 wt % to about 95 wt %; or about 50 wt % to about 90 wt %; or about 50 wt % to about 80 wt %; or about 50 wt % to about 70 wt %; or about 50 wt % to about 60 wt %; or about 60 wt % to about 99 wt %; or about 60 wt % to about 95 wt %; or about 60 wt % to about 90 wt %; or about 60 wt % to about 80 wt %; or about 60 wt % to about 70 wt %; or about 70 wt % to about 99 wt %; or about 70 wt % to about 95 wt %; or about 70 wt % to about 90 wt %; or about 70 wt % to about 80 wt %; or about 80 wt % to about 99 wt %; or about 80 wt % to about 95 wt %; or about 80 wt % to about 90 wt %; or about 90 wt % to about 99 wt %; or about 90 wt % to about 95 wt %; or about 95 wt % to about 99 wt %.

The finished inks of the invention typically colorant in an amount of about 1 wt % to about 70 wt %, based on the total weight of the finished ink. For example, the finished ink may contain colorant in an amount of about 1 wt % to about 60 wt %, based on the total weight of the finished ink; or about 1 wt % to about 50 wt %; or about 1 wt % to about 40 wt %; or about 1 wt % to about 30 wt %; or about 1 wt % to about 20 wt %; or about 1 wt % to about 10 wt %; or about 10 wt % to about 70 wt %; or about 10 wt % to about 60 wt %; or about 10 wt % to about 50 wt %; or about 10 wt % to about 40 wt %; or about 10 wt % to about 30 wt %; or about 10 wt % to about 20 wt %; or about 20 wt % to about 70 wt %; or about 20 wt % to about 60 wt %; or about 20 wt % to about 50 wt %; or about 20 wt % to about 40 wt %; or about 20 wt % to about 30 wt %; or about 30 wt % to about 70 wt %; or about 30 wt % to about 60 wt %; or about 30 wt % to about 50 wt %; or about 30 wt % to about 40 wt %; or about 40 wt % to about 70 wt %; or about 40 wt % to about 60 wt %; or about 40 wt % to about 50 wt %; or about 50 wt % to about 70 wt %; or about 50 wt % to about 60 wt %; or about 60 wt % to about 70 wt %.

In certain embodiments, the finished ink of the invention comprises 50 wt % of the ink vehicle of the invention, and 50 wt % of colorant, based on the total weight of the finished ink.

The finished inks of the invention advantageously have equal to or greater than about 45% BRC content, based on the total carbon in the finished ink (i.e. equal to or greater than 45% of the carbon containing materials are in the form of bio-renewable carbon). For example, the finished ink may have equal to or greater than about 50% BRC content, based on the total carbon in the finished ink; or equal to or greater than about 55%; or equal to or greater than about 60%.

EXAMPLES

The following examples illustrate specific aspects of the present invention, and are not intended to limit the scope thereof in any respect, and should not be so construed.

Test Methods

Application Strength Factor

Ink samples were reduced with water to 25 seconds EZ Zahn #2 cup viscosity, and applied to 30# bleached MG sandwich wrap stock with a 200 line 7.8 BCM hand proofer. The inks were dried in a 120° F. (~49° C.) convection oven for 30 seconds, then allow to cure in ambient conditions for 16 to 24 hours. The color density of the dried and cured inks was measured with an X-Rite 939 spectrodensitometer. The X-Rite measures yellow (Y), magenta (M), cyan (C), and black (K) density. The greatest value is the dominant color, i.e. major density, which is the density value used for calculation of a normalization factor. The control samples were Example 10 (red) and Example 11 (blue). The density determines the normalization factor as follows:

density of the test sample/density of control sample

This value is set at 100.0% for the control of the same color, and all variables are described with a density %, relative to the control applied strength. This density percentage is used to normalize the density values in "dry cycles" and "water kinetic" columns (i.e. ink transfer data), as described below.

Dry Cycles

The dry cycles test is a Sutherland Rub mechanical transfer test using the printed sample from the application strength factor test.

The printed sheet was mounted to the 2# sled, ink side down, and the unprinted backside of a sheet of the same stock substrate was mounted onto the Sutherland base. The test consisted of 25 cycles of rubbing. The background density is the density of an area of no ink transfer (i.e. the plain substrate). The background density was subtracted from the major contribution V, C, M, Y (violet, cyan, magenta, yellow) density of the area with the highest ink transfer to determine ink transfer only (i.e. density contributed only from transferred ink). That ink transfer density value was normalized using the application strength factor. The measured ink transfer density in the area of greatest ink transfer was divided by the application strength factor for the ink sample. For example, if a red ink has a major X-rite 939 ink transfer density (M-magenta) reading 0.030 for the dry cycles test and shows application at 90% of the control in the application strength factor test, then the normalized value for the dry cycle test in the table would be 0.030/0.9=0.033. Normalized transfer density must be less than 0.100 to pass established/historical print industry mechanical rub requirements.

Dry-Wet

This type of Sutherland rub test is used as an industry standard for inks printed on Cold Cup applications. Ink samples were reduced with water to 25 seconds EZ Zahn#2 viscosity, and applied with a 200 line 7.8 BCM hand proofer to the polyethylene (PE) side of PE coated bleached cup stock. The cure method was the same as described above. Unprinted stock was mounted (PE side down) to a 4# sled. Printed sample was placed face up on the base of the run tester (that is, cup nesting alignment). The first 25 cycles were run dry, followed by 25 cycles over the same area wetted with 5 g of water. No significant ink transfer to unprinted stock or color in the water puddle is allowed for a "pass" rating. No significant ink transfer is judged by whether or not it can be seen with the naked eye. The human eye generally cannot detect an X-Rite 939 density below 0.015 for V, C, M, Y, therefore if the transferred ink density is less than 0.015, the transferred ink cannot be seen, and the sample passes the dry-wet test.

Water Kinetic

This is a water wetted napkin—quantitative mechanical rub transfer test. Ink was applied and cured, as described above, except that 16# bleached sandwich wrap stock was used, instead of 30# bleached sandwich wrap stock. A fully water wetted napkin was pulled laterally over a 4 inch run of printed stock with a 2# Sutherland sled on top. A 3 inch by 4 inch piece of copy paper was placed between the sled and the wetted napkin to hold all the layers together during the test. The napkin was dried. The X-rite 939 density (major contribution V, C, M, Y) was taken for no-ink background, and the area of greatest ink transfer. Background density was subtracted from the ink transfer area, to determine the ink only transfer density. The ink only transfer density was then normalized using the application strength factor. Historical ink transfer density values must be less than 0.050 to be acceptable by industry standards.

Ketchup, Mustard, Mayonnaise

This test evaluated ink transfer to a napkin with gentle hand wipe-away of condiment over printed ink. The PE side of PE coated bleached cup stock was printed with the inks. Each condiment was placed onto an ink area of printed stock in 1 inch (2.54 cm) diameter circles. After 15 seconds, a napkin was used to remove the condiment. The napkin was inspected for ink transfer. A passing result shows very little or no ink on the napkin.

Coke®

The ink was applied and cured on the PE side of PE coated bleached cup stock. The soda was applied in a puddle, 1 inch (2.54 cm) in diameter. After 5 minutes, the soda was wiped away gently. The napkin was evaluated for ink transfer or bleed with non-aggressive wipe-away. No ink removal allowed for a pass designation.

Vegetable Oil

The ink was applied and cured on the PE side of PE coated bleached cup stock as described above. Vegetable oil is abundant in fast food. The vegetable oil was placed on a printed (ink) of the printed sample, then evaluated qualitatively for ink mobility using finger rub for 5 seconds, and finally wiped away with a napkin. A pass designation is no significant transfer of color on print or onto napkin.

400F Sled

This is a mechanical-heat resistance test method for the preprint clamshell applications, where a printed sheet is thermally laminated to a corrugated board. Ink was applied to 16# bleached sandwich wrap stock, and cured as described above. A Sutherland rub tester 400F heated 2# sled was placed directly onto the printed ink for 100 cycles of heated contact. The print was orientated for the hot sled to move through ink and non-ink areas. Upon inspection of heat contact areas, no ink transfer to non-print areas is allowed for a passing designation.

PE/Water/Cotton Wipe

This is a water wetted mechanical rub test, within the cold cup application. The inks were applied and cured on the PE side of PE coated bleached cup stock, as described above. Printed samples were soaked in room temperature water for 15 minutes. Prints were removed from the water and aggressively wiped with a wetted cotton cloth. No removal or transfer is allowed to pass this test.

Carry Up/Ink Lay

The prints were observed for any noticeable ink deposition issues. Inks were applied and cured on the PE coated side of PE coated bleached cup stock, and on 16# bleached sandwich wrap stock. The inks were applied at a viscosity of 25 seconds EZ Zahn #2, using a 200 line 7.8 BCM hand proofer. No fisheyes, pinholes, streaks, skips, or non-uniform lay allowed for a pass designation.

Aged 120° F. (~49° C.)

This test was used to determine the wet stability of the ink. Initial ink viscosity was reduced to 24 seconds on a #2 EZ Zahn cup with water, then re-measured after the ink was stored for 24 hours at 120° F. (~49° C.). Both the initial and 24 hour viscosities were measured with the ink at 70° F. (~21° C.). Elevated viscosity after 24 hours of storage indicated reactivity between ink components. Ink viscosity must not elevate more than 5 seconds over 24 hours at 120° F. (~49° C.) to receive a passing grade.

Example 1. Soy Protein-Colophony Varnish

A varnish (R4181-46A) was prepared with a soy-colophony complex. The varnish contained equal to or greater than 99% BRC content, based on the total amount of carbon in the varnish. The formulation of Example 1 varnish (R4181-46A) is shown in Table 1.

TABLE 1

Formulation of Example 1 varnish R4181-46A

| Material | wt % |
| --- | --- |
| Water (pH ≤ 7.0)* | 73.3 |
| Vegetable oil based defoamer | 1.0 |
| ADD WHILE MIXING | |
| Sobind Impression5L Soy | 9.2 |
| Colophony | 9.3 |

TABLE 1-continued

Formulation of Example 1 varnish R4181-46A

| Material | wt % |
|---|---|
| MIX @ pH = 7.0, UNTIL PARTIALLY DISOLVED TO FINE PARTICULATES THEN ADD | |
| 14% AMMONIA in water | 7.2 |
| MIX UNTIL FULLY DISSOLVED pH = 9.5 | |
| Total | 100 |

*If the water source has pH > 7.0, then 0.1% citric acid can be added to lower initial pH.

Example 1 varnish R4181-46A mimics several protein attributes found in acidic solubilized protein, including film formation, water resistance, and mechanical resistance, while the soluble form is at pH 9.5. Nearly all water-based inks, color dispersions, and resins within the art are anionic and soluble in amine-water solutions. Although many theories are possible, it is conceivable that colophony is supporting cysteine and preventing the negative performance attributes of disulfide bond formation (cystine). There is additional supporting evidence of colophony associating and/or reacting with the sulfur moiety of cysteine found in proteins. When equal parts of soy protein and colophony are heated under nitrogen to 200° c., a distinct and pungent $H_2S$ product is present after cooling to room temperature.

Example 2. Soy Protein-Colophony Ink Vehicle Made from Example 1 Varnish

A high BRC content ink vehicle (R4181-46B) was prepared using the Example 1 varnish. The formulation of Example 2 ink vehicle is shown in Table 2A.

TABLE 2A

Formulation of Example 2 ink vehicle R4181-46B

| Material | % | Solids | BRC |
|---|---|---|---|
| Example 1 varnish | 69.4 | 19.5 | 99.68 |
| Vegetable oil based defoamer | 1.0 | 100 | 93.85 |
| Emulsion polymer based on styrene and acrylates | 25.0 | 40 | 11.4 |
| Carnauba Wax Emulsion | 4.0 | 25 | 100 |
| Silicone COF adjuster | 0.6 | 100 (no carbon) | No carbon |
| Total | 100 | 15.53 | 62.39[1] |
| 600 cps, pH = 9.5 | | | |

[1]62.39% of the carbon containing materials are in the form of bio-renewable carbon (i.e. non-ancient or non-fossil-based carbon).

The Example 2 ink vehicle was compared to current (prior art) sustainable commercial ink vehicles (*Sun Chemical Products). The results are shown in Table 2B.

TABLE 2B

Comparison of Example 2 ink vehicle to commercial products

| Vehicle | BRC |
|---|---|
| *GP37000017A DPA-1480 PREP LO T.V. | 49.06 |
| *GP37000027 AQUAGREEN T.V. | 41.96 |
| *GP37000030A AQUAGREEN GR T.V. | 51.18 |
| *GP37000037 AQUAGREEN TS T.V. | 44.27 |
| Example 2 (inventive ink vehicle) | 62.39 |

The data in Table 2B demonstrates the BRC comparison of currently available film forming sustainable Sun Chemical vehicles. The exceptionally high BRC content of Example 1 varnish yields an ink vehicle, Example 2, with substantially higher BRC content than current commercial options designed for similar use.

Example 3. Soy Protein-Colophony Finished Inks Prepared with the Example 2 Ink Vehicle Finished inks were prepared by blending 50% color dispersions and 50% Example 2 ink vehicle. The formulations are shown in Table 3.

TABLE 3

Finished inks prepared with Example 2 ink vehicle

| Ex. # | Hue | Color Dispersion | Reference # |
|---|---|---|---|
| 3A | Green Shade Yellow PY14 | Flexiverse ®[1] YCD2004 (Transparent) OR YFD1123 (Opaque) | R4181-47A, R4181-47B |
| 3B | Yellow Shade Orange PO13 | Flexiverse OFD9260 | R4181-47C |
| 3C | Red Shade Orange PO34 | Flexiverse TPQ3034A | R4181-47D |
| 3D | Yellow Shade Red PR22 | Flexiverse RFD4241 | R4181-47E |
| 3E | Blue Shade Red PR57:1 | Flexiverse RFD9587 | R4181-47F |
| 3F | Further BS Red PR269 | Flexiverse RFD5104 | R4181-47G |
| 3G | Far BS Red PR122 | Flexiverse QFD2211 | R4181-47H |
| 3H | Carbazole violet PV23 | Flexiverse VFD1157 | R4181-47I |
| 3I | Green Shade Blue PB15:3 | Flexiverse BFD8153 | R4181-47J |
| 3J | Green PG7 | Flexiverse GCD9628 | R4181-47K |
| 3K | Black PB7 | 90-2113 (proprietary microwave safe pigment in use) | R4181-47L |

[1]Flexiverse ® is a trademarked name for pigment preparations supplied by Sun Chemical Corp. Table 3 has been included to demonstrate wet stability/viability of the invention with all common color pigmentation options.

Examples 4 to 6. Compositions Prepared with Albumin-Colophony Complex

A varnish (Example 4; R4181-48A) was prepared from an albumin-colophony complex. An albumin-colophony ink vehicle (Example 5; R4181-48B) was prepared using the Example 4 varnish. An albumin-colophony finished red ink (Example 6; R4181-48C) was prepared using the Example 5 ink vehicle. The formulations of Examples 4 to 6 are shown in Tables 4 to 6, respectively.

TABLE 4

Formulation of Ex. 4: albumin-colophony varnish R4181-48A

| Material | wt % |
|---|---|
| Albumin from Egg White (chicken source @ 13% protein solids) | 52.30 |
| Water (pH ≤ 7.0) | 36.55 |
| Silicone based defoamer | 0.15 |
| ADD WHILE MIXING | |
| Colophony | 6.80 |
| Mix Until Partially Dissolved w/some Particulates and Add 404-29 14% ammonia | 4.20 |
| MIX UNTIL ALL RESIN IS DISSOLVED to pH 9.4 | |
| Total | 100 |

TABLE 5

Formulation of Ex. 5: albumin-colophony ink vehicle R4181-48B

| Material | wt % |
| --- | --- |
| Example 4 varnish | 69.4 |
| Emulsion polymer based on styrene and acrylates | 25.0 |
| Vegetable Oil based defoamer | 1.0 |
| Carnauba Wax Emulsion ADD WHILE MIXING | 4.0 |
| Dow 209 S | 0.6 |
| Total | 100 |

TABLE 6

Formulation of Ex. 6: albumin-colophony finished red ink R4181-48C

| Material | wt % |
| --- | --- |
| Example 5 Ink Vehicle | 50 |
| RFD5104 Flexiverse PR 269 dispersion | 50 |
| Total | 100 |

Examples 7 to 9. Compositions Prepared with Hemp Protein-Colophony Complex

A varnish (Example 7; R4181-49A) was prepared from a hemp protein-colophony complex. A hemp protein-colophony ink vehicle (Example 8; R4181-49B) was prepared using the Example 7 varnish. A hemp protein-colophony finished blue ink (Example 9; R4181-49C) was prepared using the Example 8 ink vehicle. The formulations of Examples 7 to 9 are shown in Tables 7 to 9, respectively.

TABLE 7

Formulation of Ex. 7: hemp protein-colophony varnish R4181-49A

| Material | wt % |
| --- | --- |
| Water | 64.5 |
| Vegetable Oil based defoamer | 1.0 |
| Silicone defoamer | 0.1 |
| ADD WHILE MIXING | |
| PLNT Hemp Protein Mix dry powder (40% protein, 60% cellulose)* | 19.3 |
| Colophony | 7.7 |
| Mix Until Partially Dissolved w/some Particulates and Add | |
| 404-29 14% ammonia | 7.4 |
| MIX UNTIL ALL RESIN IS DISSOLVED | |
| Total | 100 |

*6.6% of insoluble cellulose (leaf and stem material) was removed from the final solution with a 50-micron filter material.

TABLE 8

Formulation of Ex. 8: hemp protein-colophony ink vehicle R4181-49B

| Material | wt % |
| --- | --- |
| Example 7 varnish | 69.4 |
| Emulsion polymer based on styrene and acrylates | 25.0 |
| Vegetable Oil based defoamer | 1.0 |

TABLE 8-continued

Formulation of Ex. 8: hemp protein-colophony ink vehicle R4181-49B

| Material | wt % |
| --- | --- |
| Carnauba Wax Emulsion | 4.0 |
| Add while mixing | |
| Dow 209 S | 0.6 |
| Total | 100% |

TABLE 9

Formulation of Ex. 9: hemp protein-colophony finished GS blue ink R4181-49C

| Material | % |
| --- | --- |
| Example 8 Ink Vehicle | 50 |
| BFD8153 Flexiverse PB15:4 dispersion | 50 |
| Total | 100 |

Note that although the finished ink examples above (Ex. 3A-3K, 6, and 9) all contain colorants, it would also be possible to provide finished coatings containing all of the same materials while eliminating the colorants to provide non-colored coatings for use as overprint varnishes.

Examples 10 and 11. Comparative Finished Inks

Comparative Example 10 is formulated with 50% RFD5104 Flexiverse Red 269 color dispersion/50% GP37000030A SunVisto® Aquagreen GR Tech Vehicle (Sun Chemical Corp.). This is a commercial standard ink performance control, historically pass all tests described herein, and listed in Table 13.

Comparative Example 11 is formulated with 50% BFD8153 Flexiverse Blue 15:4 color dispersion/50% GP37000030A SunVisto® Aquagreen GR Tech Vehicle (Sun Chemical Corp.). This is a commercial standard performance control, historically passing all tests described herein, and listed in Table 13.

Example 12. Comparison of Inventive Varnishes to Commercially Available Solution Resins The high BRC content inventive varnishes prepared with the protein-colophony complexes of the present invention (Examples 1, 4, and 7) were compared to commercially available renewable high BRC content solution resins. These properties are shown in Table 12.

TABLE 12

Inventive varnishes compared to commercial resins

| Anionic Solution Resin Comparison | % BRC | Water Resistance Good-average-poor | Oil Resistance | Mechanical Resistance |
| --- | --- | --- | --- | --- |
| Filtrez 531 | 90.78 | good | poor | average |
| Amberyl 890LV | 77.95 | good | poor | poor |
| Reactol 5145A | 81.36 | average | good | average |
| Example 1 | 99+ | good | good | good |
| Example 4 | 99+ | good | good | good |
| Example 7 | 99+ | good | good | good |

The BRC indicates the percentage of non-ancient carbon present. Each resin combination, which included 1% of blue dispersion (BFD8153) to trace solids movement, was applied to glass, and dried to obtain a 1 mil (25.4 μm) film on the glass. Water and oil resistance were determined by applying 3 drops of water or vegetable oil onto the thoroughly dried film of each resin combination, and the tinted varnish rubbed gently with a Q-tip for 10 seconds. If no blue is transferred to the Q-tip, resistance is good. If a slight amount of blue is transferred to the Q-tip, the result is average. If the blue tint on the Q-tip is near the density of the applied varnish, the result is poor. To test mechanical resistance, each varnish was applied to a 40 gram polyester film, then dried thoroughly. The polyester film with the dried varnish was crinkled between the thumbs of right and left hands for 15 seconds. A poor rating indicates that the varnish readily flaked away from the polyester. A good rating indicates that no resin flaked away from the polyester film after the test. An average rating showed a slight loss of varnish upon flexing.

Example 13. Comparison of Inventive Finished Inks to Commercially Available Finished Inks The performance of inventive Examples 3F, 6, and 9 was compared to the performance of comparative Examples 10 and 11 in a series of standard tests. The results are shown in Table 13.

TABLE 13

Comparison of performance of inventive finished inks to commercial finished inks

|  | Comp. Ex. 10 red | Comp. Ex. 11 blue | Inv. Ex. 3F red | Inv. Ex. 6 red | Inv. Ex. 9 blue |
|---|---|---|---|---|---|
| Application strength factor (%) | 100.0 | 100.0 | 101.1 | 99.7 | 92.2 |
| Dry cycles (normalized) | 0.027 | 0.031 | 0.017 | 0.023 | 0.028 |
| Dry-wet | Pass | Pass | Pass | Pass | Pass |
| Water kinetic (normalized) | 0.012 | 0.023 | 0.007 | 0.009 | 0.022 |
| Ketchup/ mustard/ mayo | Pass | Pass | Pass | Pass | Pass |
| Coke | Pass | Pass | Pass | Pass | Pass |
| Veg. oil | Pass | Pass | Pass | Pass | Pass |
| 400F sled | Pass | Pass | Pass | Pass | Pass |
| PE/water/ cotton wipe | 9 | 9 | 10 | 10 | 10 |
| Carry/lay | Pass | Pass | Pass | Pass | Pass |
| Aged 120° F. (~49° C.) | No issues | No issues | No issues | No issues | No issues |

Table 13 is a compilation of all critical performance test methods currently employed for sustainable ink performance testing. Many of the condiment items are specific to the fast food packaging industry, while other columns are physical ink properties. The data in Table 13 shows that inventive protein-colophony based finished inks (Examples 3F, 6, and 9) perform equally as well as established commercial inks (Comp. Examples 10 and 11) for all test specifications.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A water-soluble varnish, comprising:
   (a) 5 wt % to 20 wt % one or more neutralized unsaturated organic acids, based on the total weight of the varnish; wherein the unsaturated organic acid is in the form of colophony; and wherein the colophony comprises, in its structure, unsaturated acid containing isomers of abietic acid;
   (b) 40 wt % to 80 wt % water, based on the total weight of the varnish; and
   (c) 5 wt % to 20 wt % one or more proteins, based on the total weight of the varnish, wherein the protein is solubilized in an acid-water medium to form chemically modified cysteine that does not form disulfide bonds;
   wherein the varnish comprises equal to or greater than 90% bio-renewable carbon (BRC) content.

2. The varnish of claim 1, wherein the protein is selected from the group consisting of soy, albumin, hemp, pea, potato, wheat gluten, rice, and combinations thereof.

3. The varnish of claim 1, comprising equal to or greater than 95% BRC content.

4. The varnish of claim 1, comprising 100% BRC content.

5. The water-soluble varnish of claim 1, comprising 10 wt % to 20 wt % one or more proteins, based on the total weight of the varnish, wherein the protein is solubilized in an acid-water medium to form chemically modified cysteine that does not form disulfide bonds.

6. The varnish of claim 1, wherein the protein comprises neutralized anionic moieties.

7. The varnish of claim 6, wherein the anionic moieties are neutralized with ammonia or a volatile amine.

8. The varnish of claim 1, further comprising one or more neutralizing agents; and wherein the neutralizing agent is present in an amount of 1 wt % to 20 wt %.

9. The varnish of claim 8, wherein the neutralizing agent is selected from the group consisting of ammonia, higher amines, and combinations thereof.

10. The varnish of claim 1, further comprising one or more additives selected from the group consisting of waxes, defoamers, silicones, coefficient of friction adjusting additives, adhesion promoters, stabilizers, optical brighteners, de-gassing additives, flow promoters, antioxidants, surfactants, dispersants, plasticizers, rheological additives, and combinations thereof; wherein the additives, when the additive is present, are each individually present in an amount of 0.1 wt % to 5 wt %, based on the total weight of the varnish; wherein one or more of the additives are natural materials; and
   wherein the natural materials have a BRC content of 70% to 100%.

11. The varnish of claim 10, wherein the waxes are selected from the group consisting of amide wax, erucamide wax, polypropylene wax, paraffin wax, polyethylene wax, polytetrafluoroethylene wax, carnuba wax, soybean wax, and combinations thereof.

12. A printed substrate comprising the varnish of claim 1.

13. An article comprising the printed substrate of claim 12.

14. The article of claim 13, wherein the article is a packaging material.

15. A method of printing a substrate, comprising the steps of:
  (a) providing a substrate;
  (b) providing the varnish of claim 1;
  (c) applying the varnish on the substrate; and
  (d) drying or curing the varnish on the substrate.

16. An ink vehicle comprising the varnish of claim 1, and an emulsion polymer; wherein the varnish is present in an amount of 10 wt % to 80 wt %, and the emulsion polymer is present in an amount of 5 wt % to 50 wt %, based on the total weight of the ink vehicle.

17. The ink vehicle of claim 16, wherein the emulsion polymer is based on styrene and acrylates.

18. The ink vehicle of claim 16, wherein equal to or greater than 45% of the carbon containing materials are in the form of bio-renewable carbon.

19. A finished ink comprising the ink vehicle of claim 18; wherein (a) the finished ink consists of the ink vehicle and is a clear finished ink; or (b) the finished ink comprises:
  i. 30 wt % to 99 wt % of the ink vehicle, based on the total weight of the finished ink; and
  ii. 1 wt % to 70 wt % one or more colorants, based on the total weight of the finished ink.

20. The finished ink of claim 19, wherein the ink vehicle is present in an amount of 50 wt %, based on the total weight of the finished ink, and the colorant is present in an amount of 50 wt %, based on the total weight of the finished ink.

21. The finished ink of claim 19, wherein equal to or greater than 45% of the carbon containing materials are in the form of bio-renewable carbon.

22. A printed substrate comprising the finished ink of claim 19.

23. An article comprising the printed substrate of claim 22.

24. The article of claim 23, wherein the article is a packaging material.

25. A method of printing a substrate, comprising the steps of:
  (a) providing a substrate;
  (b) providing the finished ink of claim 22;
  (c) applying the finished ink on the substrate; and
  (d) drying or curing the finished ink on the substrate.

* * * * *